(12) United States Patent
Duffin et al.

(10) Patent No.: US 11,577,659 B1
(45) Date of Patent: Feb. 14, 2023

(54) ACCESSORY MOUNT DEVICE FOR VEHICLE

(71) Applicants: Timothy B. Duffin, Sacramento, CA (US); April J. Leone, Seattle, WA (US)

(72) Inventors: Timothy B. Duffin, Sacramento, CA (US); April J. Leone, Seattle, WA (US)

( * ) Notice: Subject to any disclaimer, the term of this patent is extended or adjusted under 35 U.S.C. 154(b) by 299 days.

(21) Appl. No.: 17/005,525

(22) Filed: Aug. 28, 2020

(51) Int. Cl.
*B60R 9/06* (2006.01)
*B60R 11/00* (2006.01)

(52) U.S. Cl.
CPC ......... *B60R 9/06* (2013.01); *B60R 2011/0071* (2013.01)

(58) Field of Classification Search
CPC .................. B60R 9/06; B60R 2011/0071
See application file for complete search history.

(56) References Cited

U.S. PATENT DOCUMENTS

| | | | | | |
|---|---|---|---|---|---|
| 2,080,527 | A | * | 5/1937 | Bixel | B60R 9/02 224/558 |
| 3,207,396 | A | * | 9/1965 | Mundell | B60R 9/06 224/500 |
| 3,443,730 | A | * | 5/1969 | Meusel | B60R 9/06 224/512 |
| 5,385,280 | A | * | 1/1995 | Littlepage | B62H 3/02 224/570 |
| 5,433,356 | A | * | 7/1995 | Russell | B25B 1/2484 224/523 |
| 5,456,564 | A | * | 10/1995 | Bianchini | B60R 9/06 224/508 |
| 5,482,424 | A | * | 1/1996 | Jones | A61G 3/0209 224/532 |
| 5,595,333 | A | * | 1/1997 | Boston | B60R 7/14 224/532 |
| 6,164,896 | A | * | 12/2000 | Cummins | B65F 1/1468 224/521 |

(Continued)

OTHER PUBLICATIONS

"Mean Mother Recovery Board Rear Wheel Holder." Outback Equipment, Dec. 22, 2018, www.outbackequipment.com.au/mean-mother-recovery-tracks-rear-wheel-holder, accessed on Jul. 22, 2020.

(Continued)

*Primary Examiner* — Justin M Larson
(74) *Attorney, Agent, or Firm* — Gardner, Linn, Burkhart & Ondersma, LLP

(57) ABSTRACT

An accessory mount device is provided for quickly securing an accessory, such as a vehicle recovery tool configured as a recovery board, to a vehicle and for quick subsequent release and removal of the tool from the mounting device. The device includes a support frame for mounting the device on a vehicle. The device includes a clamp for selectively engaging the recovery tool to secure the tool to the device. The mount device includes an actuator operably coupled to the clamp to actuate the clamp between an open position and a closed position. A tool support stanchion, as a portion of the support frame, is provided to support a portion of the vehicle recovery tool at a location apart from the clamp. The tool mount device may include a locking mechanism to retain the actuator in the closed position, particularly while driving the vehicle in rough conditions.

20 Claims, 6 Drawing Sheets

(56) References Cited

U.S. PATENT DOCUMENTS

| | | | | |
|---|---|---|---|---|
| 6,427,891 | B1* | 8/2002 | Anderson | B60R 9/06 224/570 |
| 7,090,105 | B2* | 8/2006 | Adamczewski | B60P 7/10 224/543 |
| 7,559,444 | B1* | 7/2009 | Church | B60R 7/14 224/401 |
| 7,802,708 | B2* | 9/2010 | Adamczewski | B60R 9/02 224/543 |
| 8,596,508 | B1* | 12/2013 | Steady | B60R 9/0426 224/536 |
| 9,334,689 | B2* | 5/2016 | Sautter, Jr. | B60N 3/103 |
| D803,036 | S* | 11/2017 | Horgen | D8/380 |
| 9,862,330 | B2* | 1/2018 | Sayegh | B60R 9/06 |
| 10,018,444 | B1* | 7/2018 | Nielson | F41B 5/1453 |
| 10,035,244 | B2* | 7/2018 | Onello | B60D 1/58 |
| 10,035,463 | B1* | 7/2018 | Salter | B60Q 3/80 |
| 10,035,468 | B2* | 7/2018 | Mifsud | B60R 11/06 |
| 10,059,276 | B2* | 8/2018 | Phillips | B60R 9/04 |
| 10,150,420 | B2* | 12/2018 | Stojkovic | B60J 5/047 |
| 10,457,221 | B2* | 10/2019 | Roberts | E01D 15/12 |
| 10,780,838 | B2* | 9/2020 | Vera Martin Del Campo | B60R 9/10 |
| 10,960,824 | B2* | 3/2021 | Wagner | B65F 1/1468 |
| 2002/0117526 | A1* | 8/2002 | Anderson | B60R 9/10 224/532 |
| 2003/0102343 | A1* | 6/2003 | Anderson | B60R 9/06 224/536 |
| 2003/0201290 | A1* | 10/2003 | Clausen | B60R 9/12 224/523 |
| 2007/0000962 | A1* | 1/2007 | Reeves | B60R 9/06 224/536 |
| 2007/0057000 | A1* | 3/2007 | Webster | B60R 9/06 224/531 |
| 2007/0181624 | A1* | 8/2007 | Smith | B60R 9/00 224/533 |
| 2007/0290480 | A1* | 12/2007 | Wolter | B25B 1/2484 280/415.1 |
| 2010/0072240 | A1* | 3/2010 | Cornes | B25B 1/103 224/536 |
| 2011/0162631 | A1* | 7/2011 | Tulpa | F41B 5/1449 124/1 |
| 2015/0076200 | A1* | 3/2015 | Pedrini | B60R 9/10 224/570 |
| 2017/0036615 | A1* | 2/2017 | Sayegh | B60R 9/10 |
| 2017/0217379 | A1* | 8/2017 | Mifsud | B60R 11/06 |
| 2018/0201202 | A1* | 7/2018 | Phillips | B60R 9/10 |
| 2019/0061632 | A1* | 2/2019 | Roberts | B60R 11/00 |
| 2020/0094749 | A1* | 3/2020 | Vera Martin Del Campo | B60R 9/06 |
| 2022/0126759 | A1* | 4/2022 | Robinson | B60R 9/12 |

OTHER PUBLICATIONS

"Maxtrax Mounts." Bajarack Adventure Equipment, bajarack.com/collections/maxtrax-mounts, accessed on Jul. 22, 2020.

"Trailstraps (MAXTRAX Mounting System)." RIGd Supply, www.rigdsupply.com/products/trailstraps, accessed on Jul. 22, 2020.

"Flush Flat Maxtrax Mounting Bracket Plate for Rola Titan & Yakima Flat Racks." KAON 4x4 Touring Accessories, www.kaon.com.au/flush-flat-maxtrax-mounting-bracket-plate-for-rolafbclid=lwAR3ZQx3AQpoKBVOK35grwYHutAVXN0yJKbpM3T4B76dol9Mlvm8ln8XOFxY, accessed on Jul. 22, 2020.

"How To Use MAXTRAX Mounting Pin Set: MAXTRAX Australia." Maxtrax, www.maxtrax.com.au/mounting-pin, accessed on Jul. 22, 2020.

Photograph of Cage Holder for Vehicle Recovery Board, downloaded Jul. 22, 2020.

\* cited by examiner

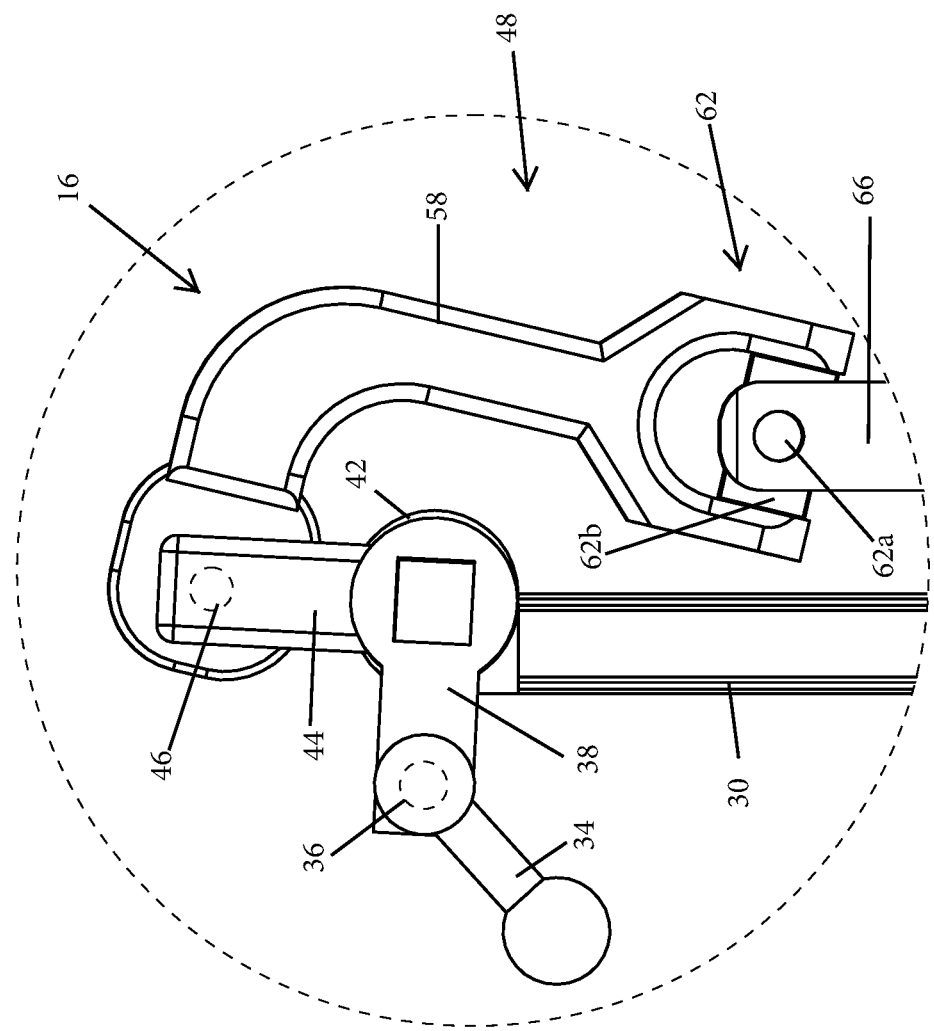
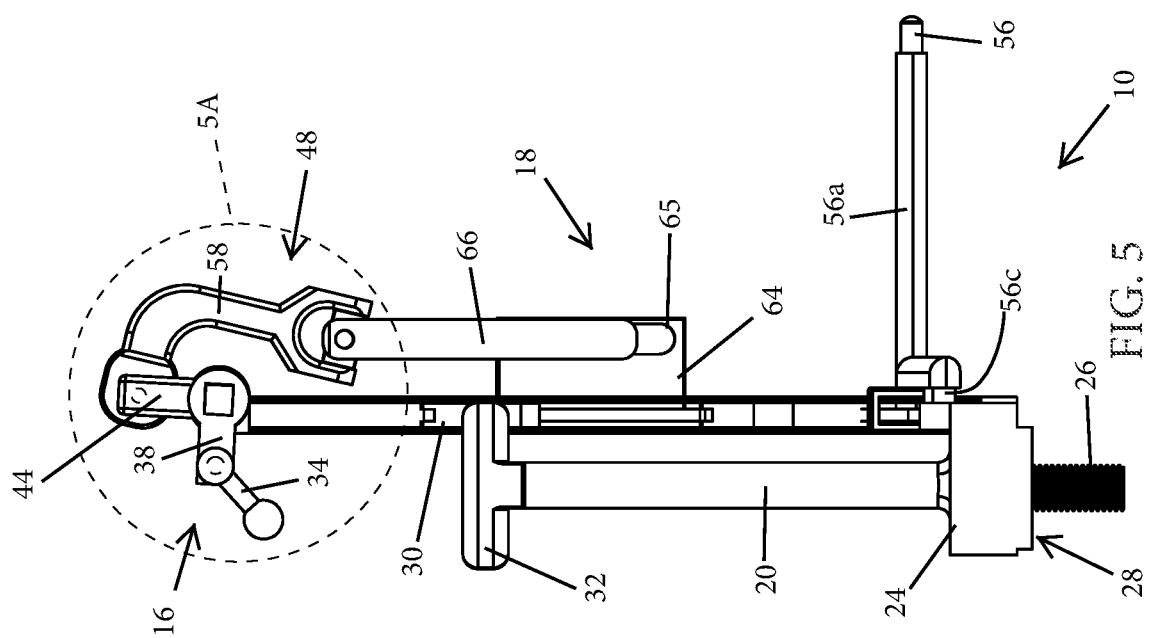

ACCESSORY MOUNT DEVICE FOR VEHICLE

FIELD OF THE INVENTION

The present invention is directed to a mounting device for securing a tool or accessory to an exterior of a vehicle, and in particular to a mounting device for securing vehicle recovery boards to an exterior portion of a vehicle.

BACKGROUND OF THE INVENTION

The use of off-road vehicle recovery tools, including traction or recovery boards, to aid in the recovery of stuck or immobilized vehicles has increased in popularity. These recovery boards are placed underneath the wheels of the immobilized vehicle to provide increased traction in order to escape from an immobilized situation. Typically, traction boards are provided and used in even quantities (e.g. 2, 4, 6 etc.) and preferably stored on the exterior of the vehicle to avoid the ingress of sand, mud, dirt or other non-desirable materials into the passenger compartment of the vehicle. In addition to using traction boards for recreational off-road driving, the use of traction boards for off-road racing has become increasingly popular.

SUMMARY OF THE INVENTION

The present invention provides a tool mounting device and method for securing a vehicle recovery tool, vehicle accessory, or other object, such as vehicle recovery boards, alongside the exterior of a vehicle in such a manner that the object can be quickly secured to or removed from the mounting device and the vehicle. In a preferred embodiment, a user is able to remove the vehicle recovery tool or other accessory from the mounting device in less than one second and subsequently replace the recovery tool with a confirmatory feedback in less than one second. The tool mounting device remains operable in the event that dirt, mud, or other aggregate build up on the device. The mounting device is capable of single-handed operation and is capable of being operated while submerged in water or partially buried in mud or sand. The confirmatory feedback can include tactile (e.g. haptic) and/or auditory feedback which communicate to the user that the device has successfully reached either the locked or unlocked position. The mounting device can be adjusted or repaired in the field, preferably with minimal tools. The mounting device includes a mechanism or arrangement of components that amplifies the user input, for example rotation of a user operated handle of ninety (90) degrees will move a clamp or gripping element one-hundred and fifty (150) degrees. The device includes an over-center latch arrangement to retain the mounting device in either the fully open position or the fully closed position. The over-center latch requires the user to overcome an increase in torque required to pass the center-point of maximum torque of the over-center latch. Once the center-point is passed, the spring force from both the over-center latch assembly and the fully inserted vehicle recovery tool interacting with the gripping element will cause the handle to be effectively latched or secured in the closed position. Thus, the mounting device will not voluntarily open without input from a user, effectively retaining the vehicle recovery tool on the mounting device during operation of the vehicle, even in rough driving conditions.

Optionally, the device includes a secondary locking mechanism to retain the handle in the fully closed position, in addition to the over-center latch arrangement. The secondary locking mechanism may require the depression of a button connected to a fail-secure, ramped lock device, requiring the user to release the secondary locking mechanism prior to operation of the mounting device. The mounting device includes a support frame and a vehicle mount or coupling element, such as threaded studs, to secure the mounting device to the vehicle. The support frame and the mounting element may support the entire weight of a person in the event that the device is used as a handle/step or as a method of emergency egress from the vehicle or potentially dangerous terrain conditions. The mounting device can be attached to the exterior of the vehicle such that neither the recovery tool nor the mounting device protrudes from the sides, top, or bottom of the vehicle when viewing the vehicle from the front, such protrusions can cause aerodynamic losses while travelling at high speeds. The mounting device is preferably mounted on the vehicle in a location and orientation relative to the vehicle such that the mount or the recovery board will not obscure views from the driver through any window of the vehicle, will not increase aerodynamic drag forces, and will not introduce unwanted conflicts with terrain, during operation of the vehicle. The device may be used with various types of vehicles, including SUVs, trucks, sedans, ATVs, campers, boats, and the like. The device, while particularly suited for securing a vehicle recovery board alongside the exterior of the vehicle, may also be used to secure other accessories or tools, such as supplemental modes of transport in the form of bicycles, skateboards, scooters, or the like, along the exterior of the vehicle.

According to one form of the present invention, a tool mount device is provided for quickly securing a vehicle recovery tool to a vehicle and providing for quick release of the vehicle recovery tool from the mount device. The mount device includes a support frame for securing the device to the vehicle and for supporting the components of the device. The mount device includes a gripping element for selectively engaging and securing a portion of the vehicle recovery tool, such as a recovery board, to the device. The gripping element is coupled to the support frame at a distal portion of a gripping element support frame that extends from a base portion of the support frame. The mount device includes an actuation mechanism operably coupled to the gripping element that is selectively operable to actuate the gripping element between an open position and a closed or latched position. The tool mount device includes a tool support stanchion or arrangement defining a portion of the support frame. The tool support arrangement is spaced apart from the gripping element in order to support a portion of the vehicle recovery tool apart from the gripping element. The tool support arrangement and the gripping element cooperate to secure the vehicle recovery tool to the device when the gripping element is in the closed position.

In one aspect, the actuation mechanism includes a rotatable handle, a bell crank, and a linkage disposed between the handle and the bell crank. Rotation of the handle in one direction causes the bell crank to rotate in one direction and rotation of the handle in the opposite direction causes the bell crank to rotate in the opposite direction. In another aspect, the tool mount device includes a linkage arrangement, such as a linkage bar or a linkage assembly, disposed between the bell crank and the gripping element. Rotation of the bell crank actuates the linkage arrangement causing the gripping element to move between the open position and the closed position depending on the rotation direction of the bell crank. The gripping element is pivotable between the closed and open positions about a gripping element pivot axis and the bell crank is pivotable about its center portion about a bell crank pivot axis. The gripping element pivot axis and the bell crank pivot axis are substantially perpendicular to one another, which allows the tool mounting device to occupy a minimal volume while providing efficient operation of the mounting device.

In yet another aspect, the linkage arrangement includes a length adjustment element for selectively adjusting the length of the linkage arrangement, which provides the user the ability to tune the movement of the gripping element relative to the gripping element pivot axis, which is particularly useful for adjusting the tool mount device to accommodate different sizes and/or brands of vehicle recovery boards.

In still another aspect, the handle includes a handle portion, a mounting pin or element, and an extension arm disposed between the handle portion and the mounting pin. The mounting pin is pivotably coupled to a base portion of the support frame and a portion of the linkage arrangement is pivotably coupled to a portion of the extension arm at a location that is spaced apart from the mounting pin.

In yet another aspect, the gripping element includes an elongated finger configured to engage the vehicle recovery tool when the gripping element is in the closed position, a rotatable shaft arrangement coupled to the finger, and a rocker arm arrangement coupled between the rotatable shaft arrangement and the actuation mechanism. Actuation of the actuation mechanism moves the rocker arm arrangement which thereby rotates the rotatable shaft arrangement and the elongated finger. The rocker arm arrangement includes a rocker arm, a bearing rotatably coupled to one end of the rocker arm, and a universal joint rotatably coupled to the opposite end of the rocker arm. The bearing is rotatably coupled to a portion of the gripping element and the universal joint is rotatably coupled to a portion of the actuation mechanism. The rocker arm assembly provides for smooth actuation and force transfer between the linkage arrangement and the gripping element. The tool mounting device may include an over-center latch arrangement configured to retain the actuation mechanism in either of the fully open position or the fully closed position.

In another aspect, the tool support arrangement includes a stanchion disposed on the support frame that is spaced apart from the gripping element. The stanchion is configured to support the vehicle recovery tool in an upright orientation relative to a base portion of the support frame. The stanchion may include a plurality of hooks or forks configured to secure portions of the vehicle recovery tool in relation to the support frame of the tool mounting device.

In another form of the present invention, a method is provided for securing a vehicle recovery tool to an exterior of a vehicle and subsequently releasing the recovery tool. The method includes installing a vehicle recovery tool onto a support frame of a tool mounting device that is configured for attachment to an exterior of a vehicle, then rotating a handle of an actuation mechanism to cause a rotating clamping element of the tool mounting device to rotatably close over a portion of the recovery tool. The method further includes providing confirmatory feedback, in the form or a tactile or auditory response, to a user of the tool mounting device to confirm that the clamping element is fully closed over the recovery tool. The method includes rotating the handle in the reverse direction to open the clamping element to release and remove the recovery tool from the tool mounting device. The method may include releasing a secondary locking mechanism proximate the handle prior to rotating the handle in the reverse direction. The method may further include amplifying the rotation angle of the handle, with the actuation mechanism, such that the rotation angle of the clamping element is greater than the rotation angle of the handle.

Accordingly, the present invention provides a fast and efficient mounting device for securing a vehicle recovery board to an exterior portion of a vehicle. The mounting device provides for quickly installing the recovery board to the mounting device with single-handed operation by a single user, and for quick subsequent removal of the recovery board from the mounting device. This allows a user to quickly remove the recovery tool to begin extracting an immobilized vehicle and to then quickly re-install the recovery board onto the mounting device in a quick and efficient manner to reduce the down time required to extract the vehicle. The mounting device includes a gripping element that rotatably engages the recovery tool that is installed on the mounting device. The gripping element is actuated by an actuation mechanism that includes a plurality of linkages, a bell crank, and a rotatable handle. The actuation mechanism is configured to amplify the user's inputs to efficiently actuate the gripping element. The mounting device includes an over-center latch mechanism that secures the handle in a respective open or closed position. The actuation mechanism may include a confirmatory feedback response to alert the user that the mounting device has been fully engaged. The mounting device may be coupled to various portions of the exterior of the vehicle, for example, a rear bumper, a rear door panel, a tire carrier of the vehicle, a truck bed, a truck bed rail, a roof of the vehicle, or a side wall of the vehicle or the like, as desired by the user.

These and other objects, advantages, purposes and features of this invention will become apparent upon review of the following specification in conjunction with the drawings.

BRIEF DESCRIPTION OF THE DRAWINGS

FIG. 5 is a left side elevation view of the tool mount device of FIG. 1;

FIG. 5A is an enlarged view of the region designated 5A in FIG. 5;

DESCRIPTION OF THE PREFERRED EMBODIMENTS

Figure 1:
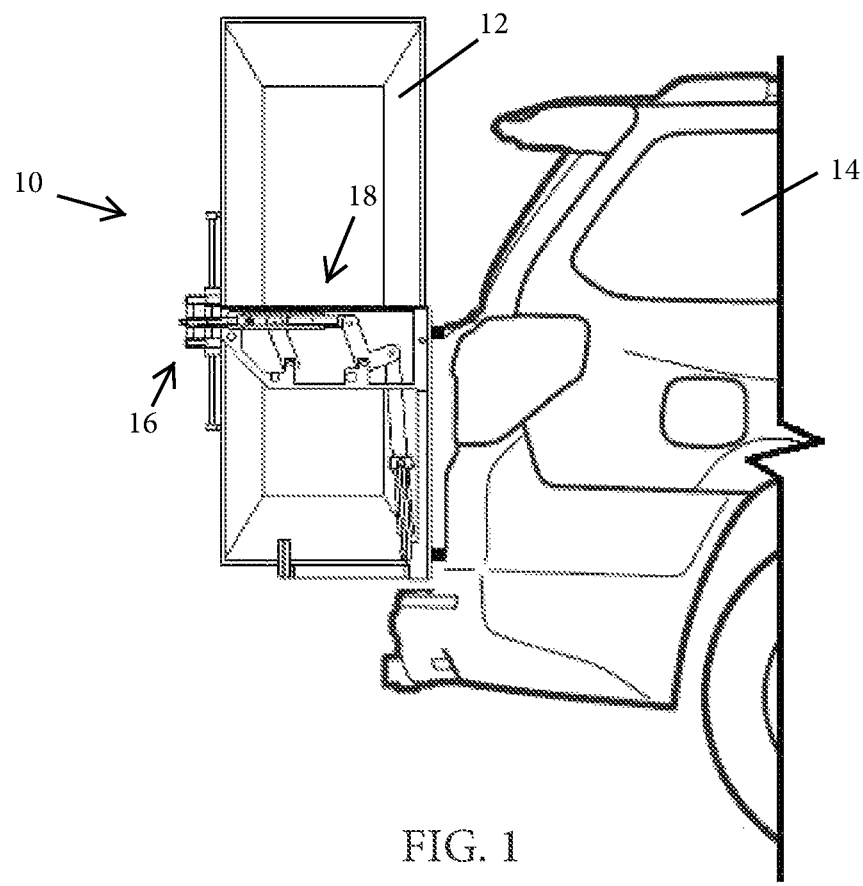
FIG. 1 is an elevation view of a tool mount device for a vehicle in accordance with the present invention, depicting the tool mount device coupled to a rear portion of a vehicle and a vehicle recovery tool secured in the tool mount device.
Figure 2:
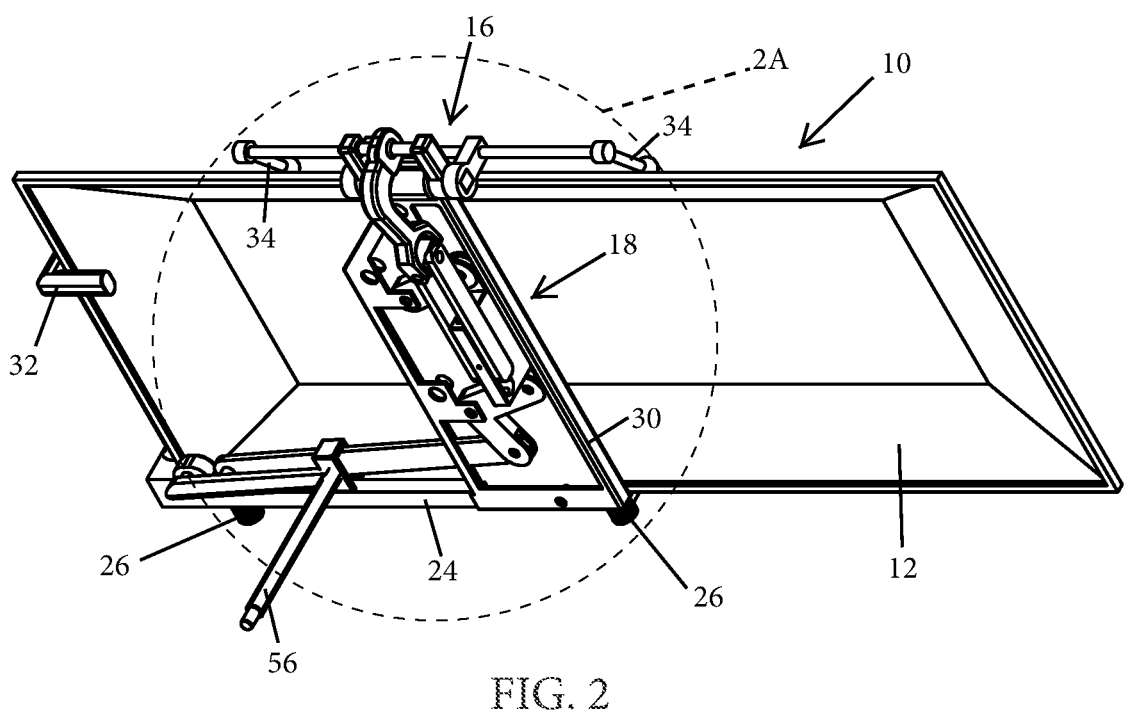
FIG. 2 is top-right perspective view of the tool mount device of FIG. 1, depicting a gripping element of the tool mount device in a closed or latched position.
Figure 3:
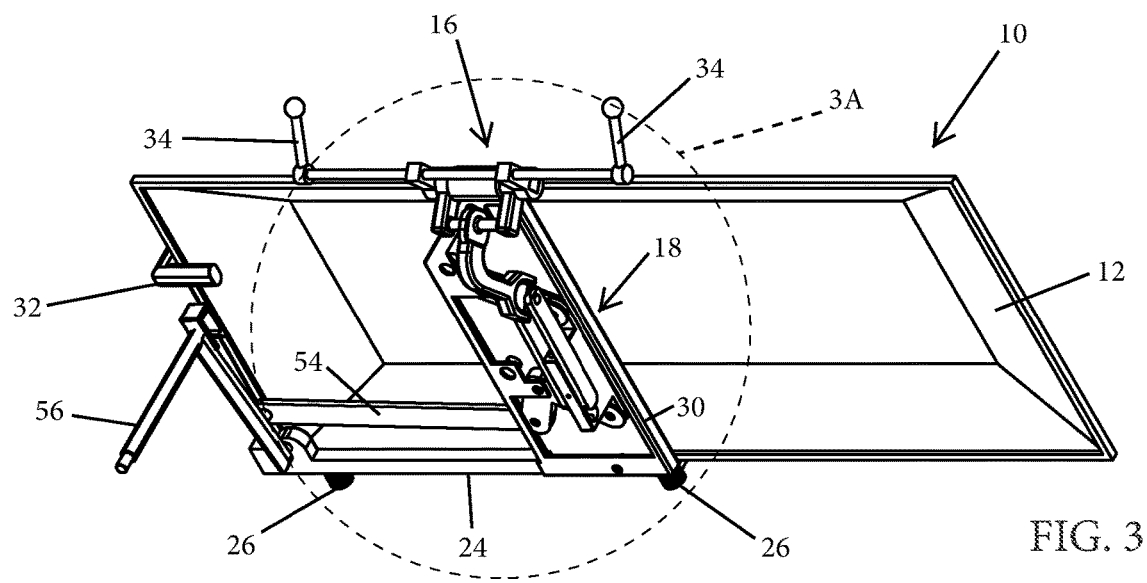
FIG. 3 is another top-right perspective view of the tool mount device of FIG. 1, depicting the gripping element of the tool mount device in an open position.
Figure 4:
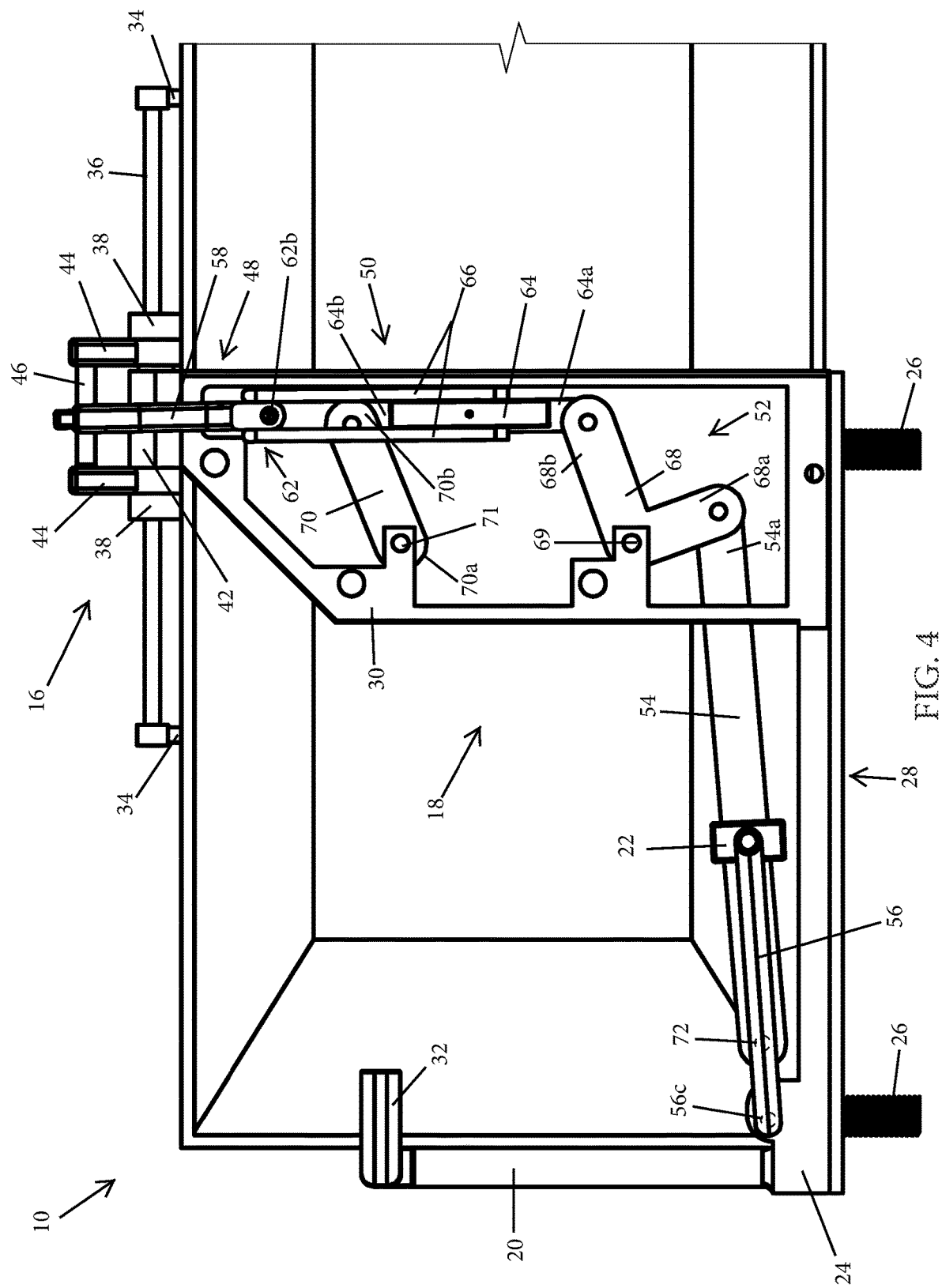
FIG. 4 is an elevation view of the tool mount device of FIG. 1, depicted with a portion of a vehicle recovery tool secured in the tool mount device.
Figure 6:
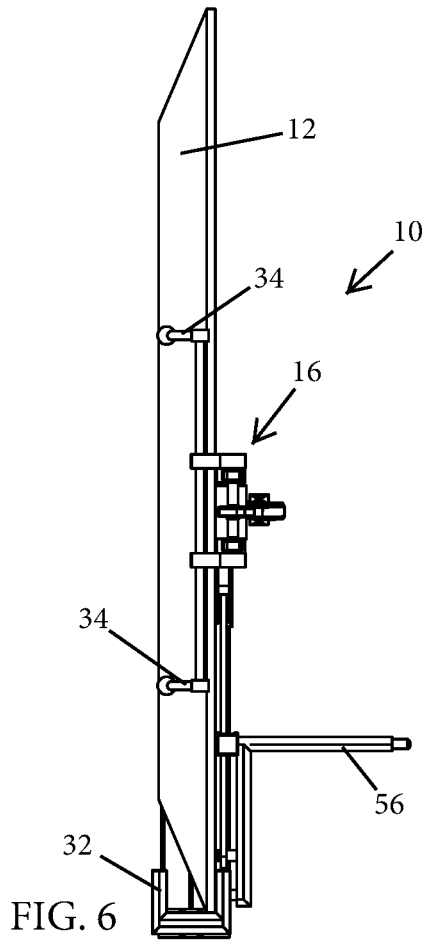
FIG. 6 is a top plan view of the tool mount device of FIG. 1, depicted with the gripping element in the closed position.
Figure 8:
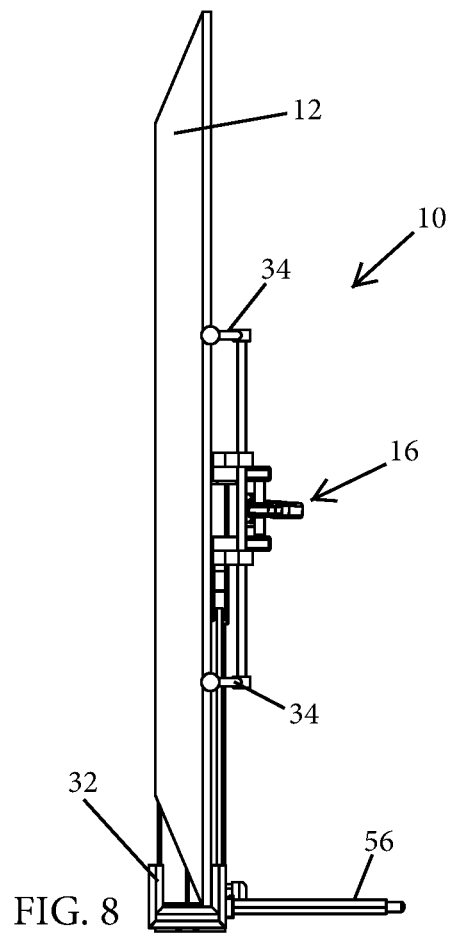
FIG. 8 is a top plan view of the tool mount device of FIG. 1, depicted with the gripping element in the open position.

Referring now to the drawings and the illustrative embodiments depicted therein, a vehicle accessory mount or tool mounting device 10 is provided for securing or mounting a tool or other object, such as a vehicle recovery tool in the form of a traction board 12, to an exterior portion of a vehicle 14, such as at a rear portion of a vehicle 14 (FIG. 1). The device 10 is provided for quickly securing the recovery tool 12 to the vehicle with only a single user without the need for additional straps or securing elements to maintain the tool 12 alongside the vehicle. The tool mounting device 10 includes a gripping element, such as a latch or clamp 16 for selectively engaging or clamping the recovery tool 12 to the mounting device 10. An actuator or actuation mechanism 18 is provided to allow the user to quickly actuate the gripping element 16 from a location that is remote from the gripping element 16, such as to allow the user to insert the recovery tool 12 into the correct position in the mounting device 10 and hold the recovery tool 12 in place while simultaneously actuating the gripping element 16. The mounting device 10 includes a tool support arrangement, such as in the form of a stanchion 20 to secure a portion of the recovery tool 12 at a location other than at the gripping element 16 (FIGS. 4-5). The gripping element 16 is actuatable between a fully open position, as shown in FIG. 3, in which the recovery tool 12 can be easily inserted or installed onto or removed from the mounting device 10 and a fully closed or latched position, as shown in FIG. 2, in which the recovery tool 12 is clamped onto the mounting device 10 such that it is inhibited from bouncing, rattling, or disengaging relative to the mounting device 10. The mounting device 10 is preferably operable by the user with a single hand and optionally provides confirmatory feedback to the user, such as an auditory or haptic click, when the gripping element 16 is actuated to the fully closed position. Additional features may include an actuation amplification arrangement to amplify the input force of the user from the actuation mechanism 18 to the gripping element 16, a handle rotation limiting element 22, and a secondary locking mechanism that secures the actuation mechanism 16 from voluntarily moving, such as due to vibration during operation of the vehicle in rough driving conditions. The mounting device 10 may be adapted for use with various vehicle types, including SUVs, trucks, sedans, tractors, boats, campers, recreational vehicles, and the like, as desired. While the accessory mounting device 10 of the illustrated embodiments is particularly well suited for securing vehicle recovery boards, it will be appreciated that the device 10 may be used for securing other accessories, such as in the form of garden tools, bicycles, surfboards, skateboards, ramps, skis or snowboards, or the like.

In the illustrated embodiment of FIGS. 1-9, the tool mounting device 10 includes a support frame 24 for supporting the recovery tool 12, supporting the various components of the device 10, and for attaching the device 10 to a vehicle 14, such as along a rear portion of the vehicle 14. The support frame 24 includes a vehicle mount or coupling element, such as threaded studs 26 (FIGS. 2-5), for coupling the device 10 to the vehicle 14. For example, the threaded studs 26 may pass through holes drilled in tire carrier frame at the rear of the vehicle and be secured to the tire frame with nuts (not shown). The support frame 24 includes a base portion 28 along which the threaded studs 26 are fixed and along which a tool support arrangement, in the form of a stanchion 20, and a gripping element support frame 30 are fixed. The device 10 may be coupled to the vehicle 14 in various manners and at various locations, such as at a rear bumper, along a side of the vehicle, a truck bed rail, a rear lift or swing gate, the roof of the vehicle 14, or at other locations. While the vehicle coupling element 14 is shown as threaded studs, the device 10 may be mounted to a vehicle with a different mount type, such as a hitch mount to couple the device 10 to a hitch receiver mounted on the vehicle 14.

In the illustrated embodiment of FIG. 1, the mounting device 10 is oriented relative to the vehicle 14 such that the long dimension of the recovery tool 12 is perpendicular to the ground surface and the thinnest dimension of the recovery tool 12 is parallel to the forward direction of travel of the vehicle. Mounting the device 10 relative to the vehicle such that an installed recovery tool 12 has its thinnest dimension parallel to the forward direction of travel provides several advantages, including reduction of forwardly exposed area of the recovery tool which decreases drag on the tool, limited visual obstructions to the vehicle operator and passengers from inside the passenger cabin of the vehicle, and efficient space use allowing a user to access other accessories or tools without having to remove the recovery tool from the mounting device 10. Alternatively, the mounting device 10 may be mounted relative to the vehicle 14 in different orientations, as desired. For example, the mounting device 10 may be oriented relative to the vehicle 14 such that the thinnest dimension of the installed recovery tool 12 is upright relative to the ground surface (e.g. perpendicular to the direction of forward travel of the vehicle) with the long dimension generally parallel to the ground surface.

The stanchion 20 and support frame 30 are fixed at respective ends of the base portion 28 (FIGS. 2-4). The tool support arrangement in the illustrated embodiment is shown as a stanchion 20, however other forms of support structures may be provided. The stanchion 20 is rigidly fixed to the base portion 28 upwardly (relative to FIGS. 4-5) from the base portion 28. The stanchion 20 includes a brace or fork 32 at the distal end of the stanchion 20. The fork 32 is provided for supporting the recovery tool 12 in an upright orientation relative to the base portion 28, which is particularly useful for properly aligning the recovery tool 12 on the device during loading of the tool and for cooperating with the gripping element 16 to retain the tool 12 during operation of the vehicle 14. In the illustrated embodiment, the stanchion 20 supports a portion of the recovery tool 12 at a location apart from the gripping element 16 to provide added security for the recovery tool 12. Optionally, the stanchion 20 may include a plurality of forks, hooks, or other securing elements to support portions of the vehicle recovery tool 12 when it is fully installed on the mounting device 10.

Figure 2A:
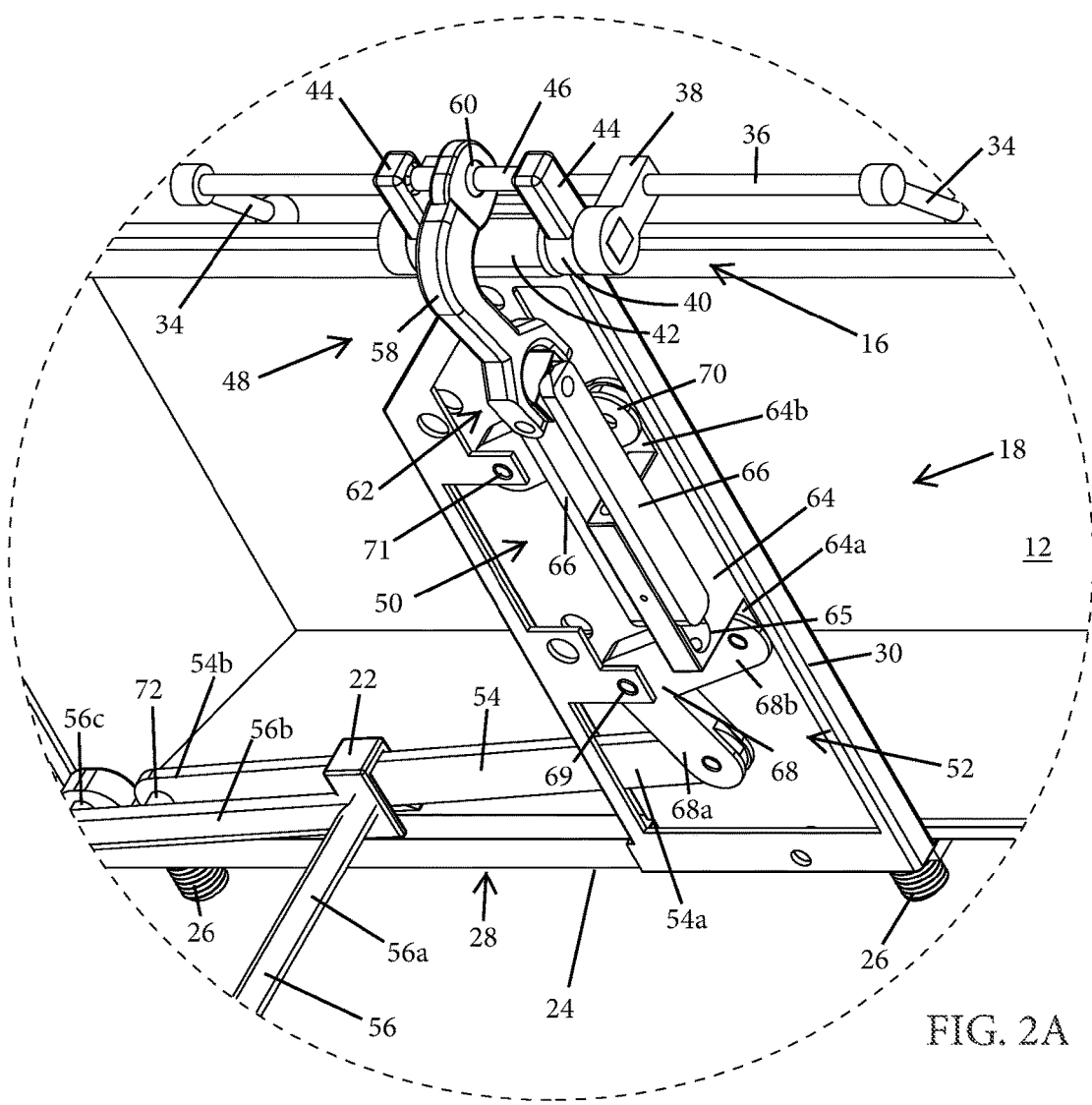
FIG. 2A is an enlarged view of the region designated 2A in FIG. 2.
Figure 3A:
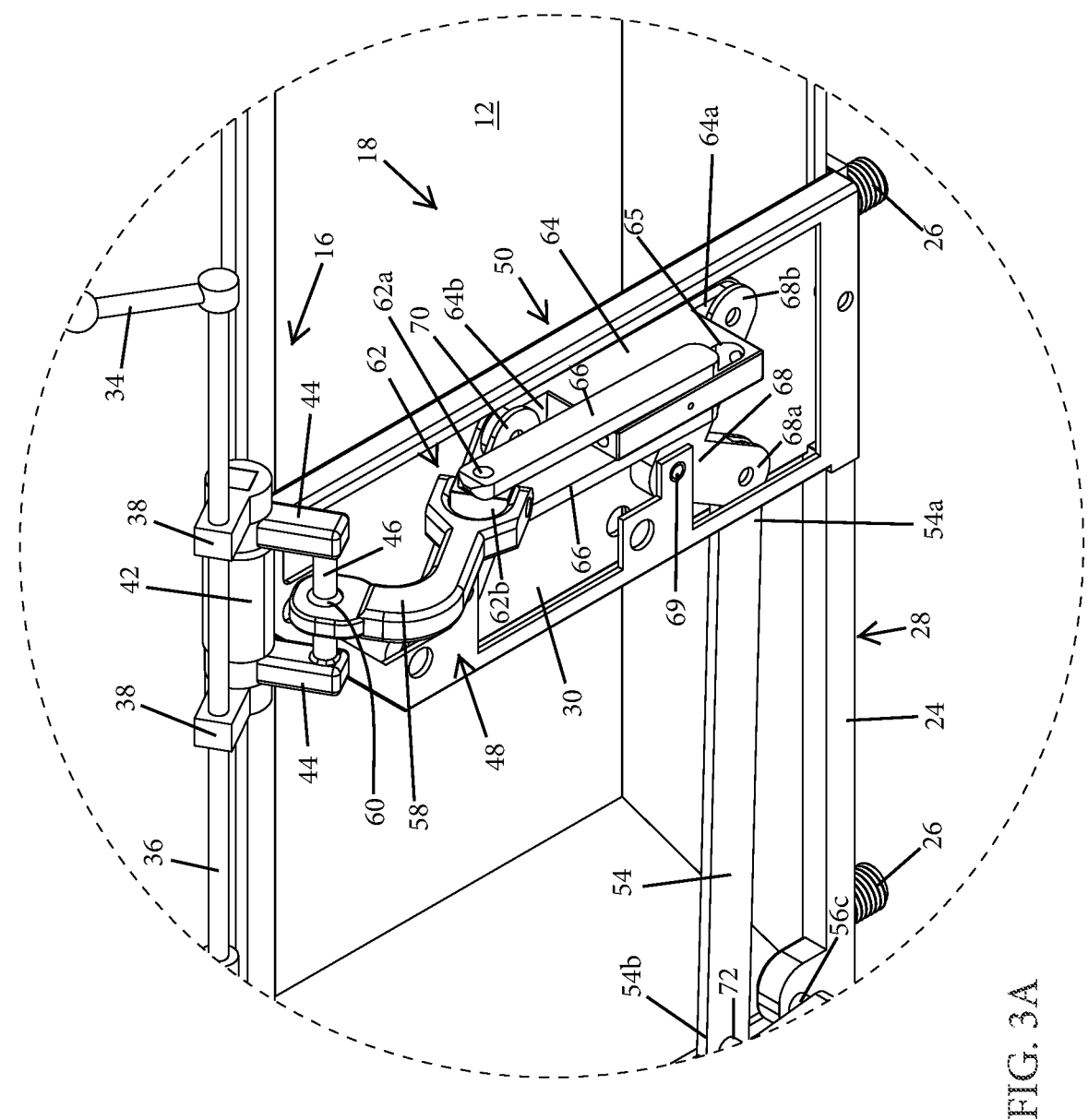
FIG. 3A is an enlarged view of the region designated 3A in FIG. 3.
Figure 7:
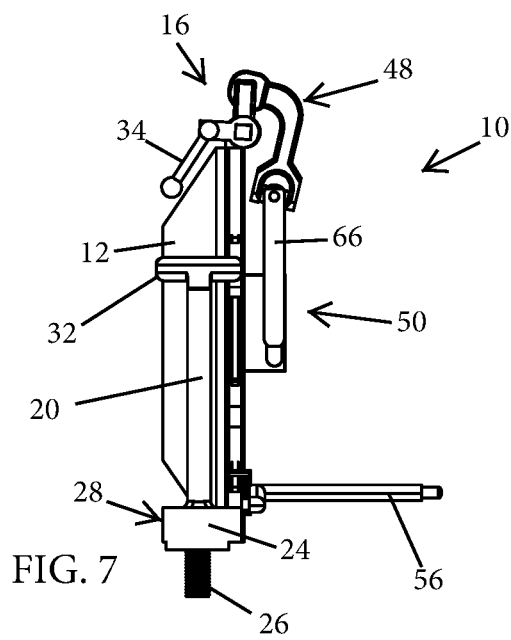
FIG. 7 is a left side elevation view of the tool mount device of FIG. 6.
Figure 9:
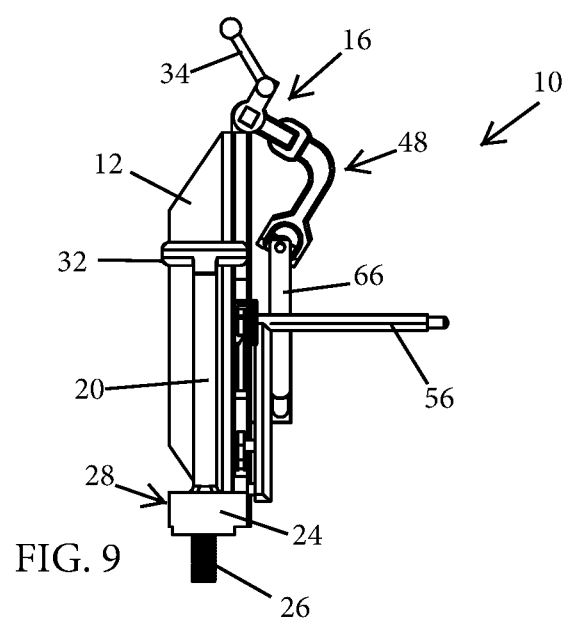
FIG. 9 is a left side elevation view of the tool mount device of FIG. 8.

The gripping element 16 as depicted in the illustrated embodiments of FIGS. 1-9 provides a selectively rotatable latch mechanism that includes a pair of latch contact elements or prongs, in the form of elongated rods, bars, or fingers 34, and a pivoting shaft arrangement including a first pivoting shaft 36, pivoting arms 38, a rotating shaft 40, a second pair of pivoting arms 44, and a second pivoting shaft 46. The fingers 34 are provided to directly contact and secure the recovery tool 12 to the device 10 when the gripping element 16 is in the closed position. In the illustrated embodiment, the fingers 34 are fixed on respective ends of the first pivoting shaft 36. The pivoting shaft 36 is coupled about a middle portion to the first pair of pivoting bars or arms 38 (FIGS. 2A and 3A). The pivoting arms 38 are fixed on respective ends of the rotating shaft 40 which is rotatably coupled through a sleeve 42 that is fixed at a distal end of support frame 30. The second pair of pivoting bars or arms 44 are fixed to the rotating shaft 40 inboard of respective ones of the first pair of pivoting arms 38. The second pivoting shaft 46 is fixed between distal ends of pivoting arms 44. The gripping element is arranged in a manner such that as the second pivoting shaft 46 is forced to move (i.e. pivot) the shaft 46 forces the pivoting arms 44 to pivot, thereby rotating the shaft 40 about its major (i.e. longitudinal) axis. The rotation of shaft 40 causes arms 38 to rotate which thereby moves (i.e. pivots) the first pivoting shaft 36 along an arcuate path. The movement of the pivoting shaft 36 along the arcuate path causes the fingers 34 to rotate relative to the longitudinal axis of the rotating shaft 40. For example, if the second pivoting shaft 46 is forced to move away from the base portion 28 the rotating shaft 40 will rotate counterclockwise as viewed from the left side of the device 10 as depicted in FIGS. 7 and 9. This rotation of the rotating shaft 40 causes the fingers 34 to rotate downward or toward the base portion 28, i.e. an upward motion (away from the base portion) of the pivoting shaft 46 causes the fingers 34 to rotate downward toward the base portion 28, and vice versa, in relation to the views of FIGS. 7 and 9. While the illustrated embodiment provides an arrangement of pivoting and rotating shafts 36, 40, 46, arms 38, 44, and elongated fingers 34, it will be appreciated that the contact element of the gripping element 16 may require fewer components to rotatably couple to the actuation mechanism 18 or may be directly actuated by a linkage of the actuation mechanism 18, such as via a bell crank. It will also be appreciated that although a pair of fingers 34 are illustrated, a single finger 34 or contact element may be sufficient to secure the recovery tool 12 to the device 10.

The actuation mechanism 18 is operably coupled to the gripping element 16 and provides for single-handed actuation or operation of the mounting device 10 by a single user. In the illustrated embodiment of FIGS. 1-9, the actuation mechanism includes a rocker arm assembly or arrangement 48, a rocker arm linkage assembly or arrangement 50, a bell crank assembly or arrangement 52, a bell crank linkage bar or arm 54, and a rotating handle 56 for operating the actuation mechanism 18. The rocker arm assembly 48 includes a rocker arm 58 having a bent or angled body with a rotating or spherical bearing 60 at one end of the rocker arm 58 and a universal joint (U-joint) 62 at the opposite end of the rocker arm (FIGS. 2A, 3A, 4-5A). The rocker arm linkage assembly 50 is operably coupled between the rocker arm assembly 48 and the bell crank assembly 52. Linkage assembly 50 includes a linkage block 64 and a pair of linkage arms 66 coupled to the linkage block 64. The linkage block 64 is moveably supported on the gripping element support frame 30 such that the block 64 can move back and forth linearly between the gripping element 16 and the base portion 28 of support frame 24. The linkage arms 66 may be adjustably mounted to respective sides of the linkage block 64, such as mounted through a slot 65, with a gap equal to the width of the block 64 formed between the pair of linkage arms 66. The adjustability of the linkage assembly allows for tuning the rotation arc of the gripping element 16 relative to the pivot axis of the rotating shaft 40. It will be appreciated that other configurations of the linkage assembly 50 may be utilized, such as a unitary linkage body or singular linkage bar, while providing the same function as the illustrated components of the assembly 50. Optionally, the linkage assembly 50 may include a threaded union or turnbuckle element that allows for adjustment of the length of the linkage assembly 50 to provide for tuning adjustment for the gripping element 16.

The bell crank assembly 52 includes a bell crank 68 and a pivoting linkage or guide arm 70, as best shown in FIGS. 2A and 3A-4. The bell crank 68 includes a first leg 68a and a second leg 68b fixed to one another at an angle. The bell crank 68 is pivotably mounted about a center portion to the gripping element support frame 30 at a pivot pin 69 (FIGS. 2A and 3A-4) and the guide arm 70 is spaced apart from the bell crank 68 and pivotably coupled about a first end 70a to the gripping element support frame 30 at a pivot pin 71 (FIGS. 2A and 4). It will be appreciated that the pivoting guide arm 70 may be omitted without significantly effecting the operation of the bell crank assembly 52. The bell crank linkage arm 54 is operably coupled between the bell crank assembly 52 and the rotating handle 56. The rotating handle 56 includes a grip portion 56a, an extension arm 56b, and a handle mounting element, such as a mounting pin 56c. The handle 56 is rotatably coupled to the base portion 28 of the support frame 24 via the mounting pin 56c, wherein the mounting pin 56c can rotate relative to the support frame 24 about a central axis of the mounting pin. The mounting pin 56c is spaced apart from the gripping element support frame 30. The spacing between the handle 56 and support 30 provides for utilizing torque and other mechanical advantage to allow the user to quickly and efficiently operate the gripping element 16 with single-handed operation to secure the recovery tool 12 to the device 10.

The following further describes the relative interconnections of the components of the gripping element 16 and the actuation mechanism 18, including the components of the rocker arm assembly 48, the rocker arm linkage assembly 50, and the bell crank assembly 52. The spherical bearing 60 is rotatably mounted around the second pivoting shaft 46 of the gripping element 16 to allow substantially frictionless interaction between the rocker arm 58 and the pivoting shaft 46 (FIGS. 2A and 3A). The U-joint 62 is provided to couple the rocker arm 58 to the pair of linkage arms 66 to allow the rocker 58 arm to substantially freely rotate about the distal end of the linkage arms 66, as discussed in further detail below. The bell crank 68 is pivotally coupled at the distal end of the second leg 68b to a first end 64a of the linkage block 64 and pivotably coupled at the distal end of the first leg 68a to a first end 54a of the bell crank linkage arm 54 (FIGS. 2A and 4). Linkage assembly 50 is configured to move back and forth relative to the gripping element 16 to transfer motion from the bell crank assembly 52 to the rocker arm assembly 48. A second end 70b of the pivoting linkage arm 70 is pivotably coupled to a second end 64b of the linkage block 64 (FIG. 4). The handle includes a linkage arm attachment pin 72 that is spaced apart or offset from the handle mounting pin 56c. A second end 54b of the bell crank linkage arm 54 is pivotably coupled to pin 72. The offset between the mounting pin 56c and attachment pin 72 creates a gear effect to drive the linkage arm 54 when the handle 56 is rotated.

The following describes the relative motions and interactions between the components of the gripping element 16 and the actuation mechanism 18, including the components of the rocker arm assembly 48, the rocker linkage assembly 50, the bell crank assembly 52, the linkage arm 54, and the handle 56. For example, if a user wants to move the gripping element from the open position (FIGS. 3-3A and 8-9) to the closed position (FIGS. 2-2A and 4-7), the user rotates the handle 56 toward the gripping element support frame 30 (or clockwise as viewed from FIG. 1). Due to the offset between the mounting pin 56c and the attachment pin 72, the linkage arm 54 moves toward support frame 30 which pushes the distal end of the first leg 68a of the bell crank away from the mounting pin 56c. The bell crank 68 rotates about its center portion causing the distal end of the second leg 68b to move away from the base portion 28 of frame 24 and toward the gripping element 16. The distal end of the second leg 68b causes the rocker arm linkage assembly 50 to move toward the gripping element 16 such that the linkage arms 66 move the rocker arm 58 toward the gripping element 16.

In the illustrated embodiment, the bell crank 68 pivots about an axis defined through the center of the pivot pin 69 and the gripping element 16 pivots about an axis defined through a center of the rotating shaft 40. The axes of rotation of the bell crank 68 and the gripping element 16 are substantially perpendicular to one another, which allows the mounting device 10 to occupy a small envelope or volume of space proximate the vehicle. The small volume of the device 10 reduces potential impact points between the mounting device 10 and terrain experienced during operation of the vehicle. It will be appreciated that the various components of the mounting device 10 may be oriented in different configurations relative to one another, as compared to the illustrated embodiment, while still performing substantially the same function to secure a vehicle recovery tool 12 to an exterior of the vehicle 14. Preferably, the mounting device 10 is secured to a portion of the vehicle 14 such that potential impacts with terrain outside the vehicle are limited. For example, with the device 10 mounted above the rear bumper of the vehicle, the approach angle and departure angle of the vehicle 14 as it ascends or descends an obstacle is substantially unchanged with the mounting device 10 installed on the vehicle 14 as compared to those angles prior to installation of the device 10. Also preferably, the mounting device 10 is secured to the vehicle 14 at a location that limits or reduces any view obstructions, such as view obstructions through the rear window of the vehicle when the vehicle recovery tool 12 is secured to the device 10.

The following, with reference to the views shown in FIGS. 5-5A, 7, and 9, discusses the relative movement of the rocker arm assembly 48 in relation to the gripping element 16 and the rocker arm linkage assembly 50. The distal end of the linkage arms 66 and the gap therebetween form a first yoke of U-joint 62 and one end of the rocker arm 58 forms the second yoke of U-joint 62. The trunnion assembly of the U-joint 62 is rotatably coupled about a first axis at a first mounting pin 62a to the linkage arms 66 and rotatably coupled about a second axis at a second mounting pin 62b to the rocker arm 58 (FIG. 5A). The first mounting pin 62a is substantially parallel to the second pivoting shaft 46 and the first pivoting shaft 36. The rocker arm 58 is pivotable around the major (i.e. longitudinal) axis of the first mounting pin 62a allowing the rocker arm 58 to pivot about the distal end of the linkage arms 66. When the linkage arms 66 move toward the gripping element 16, the rocker arm 58 pushes the second pivoting shaft 46 away from the base portion 28. The bearing end of the rocker arm 58 and the second pivoting shaft 46 accordingly rotate counter-clockwise (as viewed in FIGS. 5 and 5A) relative to the longitudinal axis of the rotating shaft 40, thus the first pivoting shaft 36 and fingers 34 pivot downward toward the base portion 28. In reverse, when the linkage arms 66 move away from the gripping element 16 and toward the base portion 28, the rocker arm 58 pulls the second pivoting shaft 46 toward the base portion 28. The bearing end of the rocker arm 58 and the second pivoting shaft rotate clockwise relative to the longitudinal axis of the rotating shaft 40, thus the first pivoting shaft 46 and fingers 34 pivot upward away from the base portion 28.

While the actuation mechanism 18 is illustrated with a rocker arm assembly 48 and rocker arm linkage assembly 50, the gripping element 16 may be actuated with a simple linkage rod or bar disposed between the bell crank 68 and a component of the gripping element 16 while still providing similar function for operating the mounting device 10. The illustrated embodiment provides for a reduction in operating space required for the various components of the mounting device 10, thus reducing the volume or footprint and the operating space required to operate the mounting device 10.

The mounting device 10 may include a confirmation mechanism (not shown) for providing and auditory or haptic confirmation that the gripping element has fully engaged and thus secured the vehicle recovery tool 12. For example, as the operator rotates the handle 56 into the closed position and the fingers 34 have engaged the recovery tool 12, the confirmation mechanism will make an auditory sound or physically recognizable response to alert the user that the device 10 is fully closed.

The configuration of the actuation mechanism 18 provides an over-center latch or automatic locking arrangement to reduce or eliminate the possibility of the actuation mechanism 18 or gripping element 16 from voluntarily opening or releasing, such as during rough driving conditions. The over-center latch arrangement retains the mounting device 10 open in the open position and closed in the closed position. For example, while closing the mounting device 10, as the user rotates the handle 56 toward a center-point of rotation, the handle 56 requires a maximum torque to rotate beyond the center-point. After the center-point is surpassed, the required torque to finish rotating the handle 56 to the fully closed position is reduced. To open the mounting device 10 from the closed position, the user rotates the handle 56 toward the center-point, which requires a maximum toque to overcome and surpass the center-point. After the center-point is surpassed, the required torque to finish rotating the handle 56 to the fully open position is reduced. The arrangement of the actuation mechanism 18 and the over-center latch creates an effective spring force, which is at least partially a function of the interaction of the fingers 34 contacting the semi-rigid recovery tool 12. The offset spacing between the mounting pin 56c and attachment pin 72 may function as at least a portion of the center-point latch arrangement. The required torque to rotate the handle through the center-point of rotation is a function of this effective spring force. Preferably, the maximum required torque necessary to operate the mounting device 10 is less than about 40 foot-pounds (ft/lbs) of torque applied to the handle in either operating directions. The over-center latch arrangement requires a user to overcome the increase in torque required to pass the center-point of maximum torque. Once the center-point or rotation is passed, the effective spring force from both the mounting device 10 and the resistance from the fingers 34 contacting on the recovery tool 12 will cause the handle 56 to remain latched or secured in the closed position and retained with the effective spring force that prevents the recovery tool 12 or other installed accessories from detaching or loosening from the vehicle 14 without input from a user. As such, when the handle 56 is in the fully closed or fully opened positions, involuntary movement of the handle 56 is resisted by the effective spring force provided by the over-center latch arrangement, thereby resisting voluntary opening or closing of the mounting device 10 without user input. Optionally, the mounting device 10 includes a secondary locking mechanism (not shown) which includes a selectively operable release button, switch, or latch, such that the secondary locking mechanism requires the user to depress the release button which is connected to the handle locking element, such as a fail-secure ramped lock device. For example, in order for the user to operate/rotate the handle 56, the user must first press the release button to release the handle locking element, which may all be operable with a single hand. The secondary locking mechanism reduces or eliminates the possibility of debris or other objects releasing the gripping element 16 or actuation mechanism 18 without operator interaction.

A handle rotation limit element 22 is provided to limit the rotation of the handle 56 relative to the linkage arm 54 such that the handle 56 cannot over-rotate, which may cause malfunction of the actuation mechanism 18. In the illustrated embodiments of FIGS. 2-9, the handle rotation limit element 22 is shown as a rigid, semi-rectangular bar or strap which overlays a portion of the linkage arm 54 when the handle 56 is in the closed position. The mounting device 10 may be configured to amplify or reduce the user input from rotation of the handle, such as in a geared manner, such as by amplifying the user input from rotation of the handle of about ninety degrees (90°) to cause the gripping element 16 to rotate about one hundred and fifty degrees (150°). This amplification may be provided as a function of the relative lengths of the first leg 68a and second leg 68b of the bell crank 68. The amplification may also be provided as a function of the offset spacing between the mounting pin 56c and attachment pin 72.

The gripping element support frame 30 may include cover plates (not shown) to cover and protect the bell crank assembly 52 and a portion of the rocker arm linkage assembly 50 from debris and to protect a user from pinch hazards during operation of the mounting device 10. The pivot pins 69 and 71 may be pivotably coupled between the cover plates. An opening or slot is provided through at least one of the cover plates to allow for substantially unimpeded back-and-forth movement of the linkage block 64 during operation of the device 10. The optional cover plates are removable to allow access to the bell crank assembly 52, such as for repairing, maintaining, or inspecting the bell crank assembly 52.

Thus, the tool mounting device 10 provides a quick and efficient device and method for securing a vehicle recovery tool, e.g. a recovery board, to an exterior of a vehicle. The mounting device includes a gripping element 16 having a selectively rotatable latch mechanism for clamping or gripping the recovery tool. The gripping element 16 includes an elongated finger that engages the recovery board. An actuation mechanism 18 having a plurality of linkage arrangements, a bell crank, and a handle are provided for actuating the gripping element. The actuation mechanism provides an amplifying arrangement to amplify the user input via the rotating handle to efficiently actuate the gripping element. The actuation allows the user to operate the gripping element with single-handed operation from a location that is remote or spaced apart from the gripping element. The mounting device includes an over-center latch arrangement that retains the handle in a respective open or closed position to ensure that the mounting device does not voluntarily open during operation of the vehicle. A secondary locking mechanism may be provided to further ensure that the mounting device does not voluntarily release the recovery board. A support frame and stanchion cooperate to support the recovery board, along with the gripping element. The mounting device may include a tactile or auditory response to alert the user that the gripping element has fully engaged to secure the recovery board to the mounting device.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An accessory mount for securing an accessory to a vehicle, said accessory mount comprising:
   a support frame configured to be selectively secured to a vehicle;
   a clamp for selectively engaging and securing a first portion of an accessory to said accessory mount, said clamp coupled to a first portion of said support frame;
   an actuator coupled to said clamp and selectively operable to actuate said clamp downwardly from an open position to a closed position; and
   a rigid stationary support extending upwardly from a second portion of said support frame that is spaced apart from said first portion of said support frame, said rigid support configured for supporting a second portion of the accessory on said accessory mount;
   wherein said rigid support and said clamp cooperate to secure the accessory to said accessory mount when said clamp is in the closed position.

2. The accessory mount of claim 1, wherein said actuator comprises a rotatable handle, a bell crank, and a linkage arm disposed between said handle and said bell crank, wherein rotation of said handle in one direction causes the bell crank to rotate in one direction and rotation of said handle in the opposite direction causes said bell crank to rotate in the opposite direction.

3. The accessory mount of claim 2, further comprising a linkage assembly disposed between said bell crank and said clamp, wherein rotation of said bell crank actuates said linkage assembly causing said clamp to move between the open position and the closed position depending on the rotation direction of said bell crank.

4. The accessory mount of claim 3, wherein said clamp is pivotable between the closed and open positions about a clamp pivot axis and wherein said bell crank is pivotable about the center portion of said bell crank about a bell crank pivot axis, wherein the clamp pivot axis and the bell crank pivot axis are substantially perpendicular to one another.

5. The accessory mount of claim 3, wherein said linkage assembly comprises a length adjustment element for selectively adjusting the length of said linkage assembly providing for tuning of the movement of said clamp relative to the clamp pivot axis.

6. The accessory mount of claim 2, wherein said handle comprises a handle portion, a mounting pin, and an extension arm disposed between said handle portion and said mounting pin, wherein said mounting pin is pivotably coupled to a base portion of said support frame and wherein said linkage arm is pivotably coupled to a portion of said extension arm at a location spaced apart from said mounting pin.

7. The accessory mount of claim 1, wherein said clamp comprises an elongated finger configured to engage the accessory when said clamp is in the closed position, a rotatable shaft assembly coupled to said finger, and a rocker arm assembly coupled between said rotatable shaft assembly and said actuator, wherein actuation of said actuator moves said rocker arm assembly which thereby rotates said rotatable shaft assembly and said elongated finger.

8. The accessory mount of claim 7, wherein said rocker arm assembly comprises a rocker arm, a bearing rotatably coupled to one end of said rocker arm, and a universal joint rotatably coupled to the opposite end of said rocker arm, wherein said bearing is rotatably coupled to a portion of said rotatable shaft assembly and said universal joint is rotatably coupled to a portion of said actuator.

9. The accessory mount of claim 1, wherein said rigid support comprises a stanchion disposed on said support frame and spaced apart from said clamp, said stanchion configured to support the accessory in an upright orientation relative to a base portion of said support frame.

10. The accessory mount of claim 1, wherein said actuator comprises an over-center latch arrangement configured to retain the actuator in either of the fully open position or the fully closed position in the absence of user input.

11. A mounting device for use with a vehicle, said mounting device configured to selectively secure an object to an exterior portion of the vehicle, said mounting device comprising:
   a gripping latch that is selectively rotatable, said gripping latch comprising an elongated finger coupled to a rotating shaft assembly and a rocker arm assembly pivotably coupled to said rotating shaft assembly to actuate a rotation of said elongated finger between a closed position and an open position, wherein said finger contacts and secures an object to said mounting device when said finger is in the closed position; and
   an actuator comprising a rotating handle and a plurality of linkages coupled between said rocker arm assembly and said rotating handle, wherein rotation of said handle causes said plurality of linkages to move and actuate said rocker arm assembly, thereby rotating said rotating shaft assembly and said elongated finger.

12. The mounting device of claim 11, further comprising a support frame for removably coupling said mounting device to an exterior portion of the vehicle, said support frame comprising a base portion having a vehicle mount for coupling said mounting device to the vehicle, a latch support frame coupled to and extending away from said base portion, and a stanchion coupled to and extending away from said base portion, said stanchion spaced apart from said latch support frame, wherein said stanchion and said gripping latch cooperate to support the object relative to the vehicle.

13. The mounting device of claim 12, further comprising a bell crank operably coupled between said plurality of linkages, said bell crank rotatably coupled about a center portion to said latch support frame, wherein said bell crank comprises a first leg and a second leg fixedly coupled to each other at the center portion of said bell crank, said first leg and said second leg disposed at an angle relative to each other.

14. The mounting device of claim 13, wherein said rotating shaft assembly is configured such that said elongated finger is pivotable between the closed and open positions about a gripping latch pivot axis and wherein said bell crank is pivotable about the center portion of said bell crank about a bell crank pivot axis, wherein the gripping latch pivot axis and the bell crank pivot axis are substantially perpendicular to one another.

15. The mounting device of claim 11, wherein one of said plurality of linkages comprises a length adjustment element to selectively adjust the length of said linkage, providing for tuning of the relative open and closed positions of said gripping latch.

16. The mounting device of claim 11, wherein said actuator comprises an over-center latch arrangement configured to retain the actuator, in either of the fully open position or the fully closed position, in the absence of user input.

17. The mounting device of claim 12, wherein said handle comprises a handle portion, a handle mounting pin, and an extension arm disposed between said handle portion and said handle mounting pin, wherein said handle mounting pin is pivotably coupled to said base portion of said support frame and wherein an end portion of one of said plurality of linkages is pivotably coupled to a portion of said extension arm at a location spaced apart from said handle mounting pin to provide a rotational offset between said handle mounting pin and the coupling location between said linkage and said extension arm.

18. A method of securing an accessory to an exterior of a vehicle; said method comprising:
   installing an accessory onto a support frame of an accessory mounting device that is configured for attachment to an exterior of a vehicle;
   rotating a handle of an actuator to cause a rotating clamp of the accessory mounting device to rotatably close over a portion of the accessory; and
   wherein said rotating the handle comprises amplifying the rotation angle of the handle with the actuator such that the rotation angle of the clamp is greater than the rotation angle of the handle.

19. The method of claim 18, further comprising selectively releasing a secondary locking mechanism proximate the handle and rotating the handle in the reverse direction to open the clamp to release the accessory.

20. The method of claim 18, further comprising providing confirmatory feedback to a user of the accessory mounting device to confirm that the clamp is fully closed over the accessory.

* * * * *